3,152,887
AMERICIUM-CURIUM SEPARATION
Stephen Lawroski, Naperville, James B. Knighton, Joliet, and Robert K. Steunenberg, Naperville, Ill., assignors to the United States of America as represented by the United States Atomic Energy Commission
No Drawing. Filed May 3, 1963, Ser. No. 277,965
7 Claims. (Cl. 75—84.1)

This invention deals with a process for the separation of americium and curium values from each other by selective extraction into a molten salt.

Curium[242] is formed by neutron irradiation of americium. Curium[242] is an alpha-emitter and is to be used for isotopic power sources, for instance in Soft Lunar Landing Generators and other space probes.

One of the assignees' copending applications, namely U.S. application Serial No. 233,984, filed by Knighton and Steunenberg on October 29, 1962, deals with the separation of lanthanides from actinides by contacting the mixture containing these two groups of metals or their compounds with a molten magnesium-chloride-containing flux and a magnesium-zinc alloy; the actinides are reduced by the magnesium metal, and the metals formed are taken up by the magnesium-zinc alloy, while the lanthanides are dissolved in the flux as the chlorides. The americium, like the lanthanides, is not reduced by the metal, but is taken up as the chloride by the molten flux.

From this behavior of americium it was then expected that curium, being very similar to americium in its chemical properties, and in particular in its valence, would also enter the salt phase. However, it was found, very unexpectedly, that, when curium compounds were immersed in a magnesium-chloride-containing flux and magnesium-zinc alloy was added thereto, the curium was reduced to the metal and taken up by an excess alloy. The process of the invention is based on this finding.

It is an object of this invention to provide a process for the separation of americium from curium values which is simple and can be applied promptly after removal of the material from the reactor and prior to substantial decay of the curium.

It is also an object of this invention to provide a process for the separation of americium from curium values by which a high degree of separation is obtained.

It is finally also an object of this invention to provide a process for the separation of americium from curium values which uses materials that are not disadvantageously affected by the radiation of the compounds to be treated.

The process of this invention comprises introducing a curium- and americium-containing mixture into a molten magnesium-halide-containing flux; adding magnesium in the form of a binary magnesium-zinc alloy thereto, whereby said curium values are taken up by the alloy as the metal, while americium halide is dissolved or suspended in the flux; and separating a metal phase from a flux phase. The same results are obtained by introducing the curium- and americium-containing material into the magnesium-zinc alloy and then adding the magnesium-halide-containing flux.

Metallic americium-curium mixtures, oxides or halides, and of the latter in particular the chlorides, can be used as the starting material. If the mixture to be processed contains the oxides or halides, the curium compound is reduced to the metal while it is separated from the americium halide in the salt, so that a dual functioin is then obtained in one step.

The dependency of the distribution coefficients (i.e. w/o in flux:w/o in metal) from the magnesium concentration of the binary alloy was determined for americium and for curium by reacting americium metal and curium fluoride, respectively, in a tantalum crucible with magnesium chloride and magnesium-zinc alloys of different magnesium concentrations. The details of this study are described in the example. It was found that the higher the magnesium concentration, the higher a distribution coefficient was obtained; this was true for both curium and americium. For americium the distribution coefficients were above unity, which is desirable for good separation, with a magnesium concentration of 22% by weight and above. However, a certain zinc content is desirable to obtain a metal phase that is heavier than the flux, so that it settles at the bottom and phase separation is facilitated.

The magnesium-zinc alloy should be added in an amount greater than that stoichiometrically required for the reduction of all of the curium, because some magnesium is necessary for the collection of the curium in a metal phase. The magnesium quantity, of course, also has to be great enough to obtian optimum distribution of the americium into the flux and of the curium into the metal upon equilibration of the molten materials. A magnesium content of between about 25 and 95% by weight was found the preferred range.

Magnesium halide is the essential component of the flux, the chloride being preferred. While magnesium chloride alone is suitable for the process of this invention, it can be diluted with alkali metal and/or alkaline earth metal halides in order to obtain a flux of a lower melting point. For instance, an equimolar mixture of magnesium chloride and lithium chloride has been found satisfactory. Another flux that proved suitable is a mixture containing about 30 mole percent of sodium chloride, about 20 mole percent of potassium chloride and 50 mole percent of magnesium chloride; it melts at as low a temperature as about 390° C. The amount of the flux may vary widely, a volume ratio of flux:metal between 0.7 and 5.0 being satisfactory.

The temperature at which the process is carried out greatly depends on the melting points and thus on the composition of the flux and the alloy. As a rule, a temperature within the range of from 600 to 900° C. was satisfactory for all fluxes contemplated. If magnesium chloride alone is used, the temperature should be above 710° C., though, this being its melting point, while for the equimolar lithium chloride-magnesium chloride mixture, a temperature of about 600° C. suffices.

The process of this invention can be carried out in an ambient atmosphere of air if the magnesium content of the alloy is not higher than about 95%; then the metal is heavier than the flux layer and protected by it from oxidation. However, the use of an inert atmosphere has been advantageous in many cases.

Phase separation can be carried out by any means known to those skilled in the art. For instance, the layers can be separated by decantation, or the entire mixture can be cooled for solidification and then broken apart by mechanical means.

It will be understood that, by repeating the process, the separation can be furthermore improved.

The isolated magnesium-zinc alloy containing the curium is processed for removal of magnesium and zinc. For this purpose, the metal phase is heated above the volatilization temperature of these two metals to distill them off, whereby a residue of pure curium remains. This so-called retorting step is preferably carried out in a vacuum, because then lower temperatures can be used. However, an inert atmosphere can also be introduced instead.

In the following, an example is given for illustrative purposes.

Example

Two series of runs were carired out, one with curium fluoride and one with americium metal as the starting materials; about 0.1 milligram of the former and tracer quantities of the latter were used; they were introduced in a tantalum crucible, and 300 grams of magnesium chloride were added thereto. Thereafter 200 grams of zinc were incorporated. The reaction mixture was heated to 800° C. in an argon atmosphere and stirred at a rate of 300 r.p.m. After an equilibration period of one hour, samples were taken of both flux and metal phases and analyzed for americium and curium, respectively. From these analyses the distribution coefficients were determined, and from the distribution coefficients the separation factors were calculated, which are the distribution coefficients for americium divided by those for curium.

Thereafter magnesium was added, and the process, including analyses, was repeated. A number of additional runs were carried out with different magnesium concentrations, including 100%. In the table below, the distribution coefficients $K_D$ and the separation factors obtained with the various magnesium concentrations in the reducing alloy are summarized.

| Mg Content, w/o | $K_D$ Am | $K_D$ Cm | Separation Factor, $K_D$ Am:$K_D$ Cm |
|---|---|---|---|
| 5 | 0.32 | 0.0225 | 14.2 |
| 10 | 0.35 | 0.018 | 19.4 |
| 20 | 0.84 | 0.031 | 27.1 |
| 30 | 1.72 | 0.058 | 29.7 |
| 40 | 3.0 | 0.100 | 30.0 |
| 50 | 4.5 | 0.155 | 29.0 |
| 60 | 6.5 | 0.225 | 28.9 |
| 70 | 9.2 | 0.301 | 30.6 |
| 80 | 12.9 | 0.400 | 32.3 |
| 90 | 18.0 | 0.51 | 35.3 |
| 100 | 25.0 | 0.62 | 40.3 |

The above data show that improved separation is obtained with increasing magnesium content.

The process of this invention is useful in the preparation of curium from higher plutonium isotopes. For this purpose plutonium[240], for instance, is bombarded with neutrons in a nuclear reactor whereby plutonium[241] is obtained, which decays to americium[241]. After removal of the mixture of these isotopes from the reactor, americium is separated from the plutonium by the process of the above-mentioned copending application Serial No. 233,984.

The separated americium[241] is then again neutron-bombarded whereby americium[242] is obtained which beta-decays to form curium[242]. The curium[242] is then isolated by the process of this invention.

It will be understood that the invention is not to be limited by the details given herein but that it may be modified within the scope of the appended claims.

The embodiments of the invention in which an exclusive property or privilege is claimed are defined as follows:

1. A process of separating americium values from curium values present in the form of a mixture, comprising introducing said mixture into a molten magnesium-halide-containing flux; adding magnesium in the form of a binary magnesium-zinc alloy thereto, whereby said curium values are taken up by the alloy as a metal phase, while americium halide enters the flux; and separating the metal phase from a flux phase.

2. The process of claim 1 wherein the temperature of the reaction mixture is maintained at between 600 and 900° C.

3. The process of claim 1 wherein the flux is a mixture of magnesium chloride and alkali metal chloride.

4. The process of claim 1 wherein the flux is magnesium chloride and the temperature is held at at least 710° C.

5. The process of claim 1 wherein magnesium-zinc alloy is added in a quantity to have an excess of magnesium present.

6. The process of claim 5 wherein the magnesium-zinc alloy has a magnesium concentration of between 25 and 95% by weight.

7. The process of claim 1 wherein the metal phase containing the curium is retorted for volatilization of magnesium and zinc.

References Cited in the file of this patent

UNITED STATES PATENTS 3,109,731    Knighton    Nov. 5, 1963
3,120,435    Chiotti    Feb. 4, 1964

OTHER REFERENCES

Atomic Energy Commission Document ANL–6543, June 1962, pp. 49–50.

Atomic Energy Commission Document ANL–6569, August 1962, pp. 39–43.